Aug. 11, 1959  C. PARKER  2,899,110
COLLAPSIBLE CONTAINER
Filed March 12, 1957  2 Sheets-Sheet 1
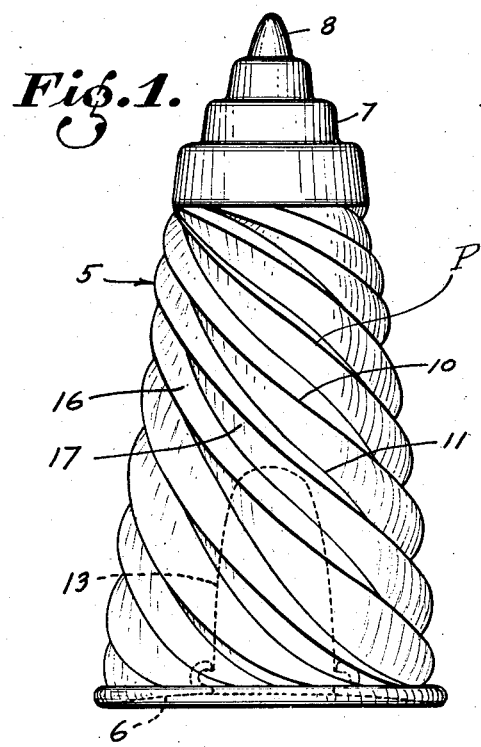
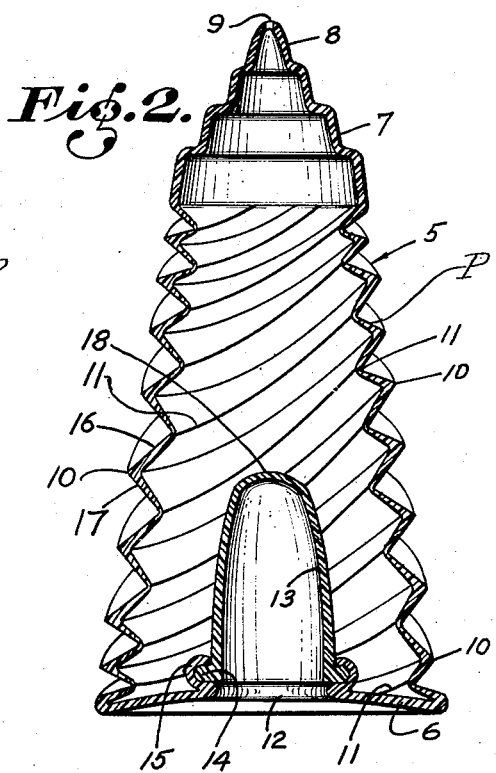
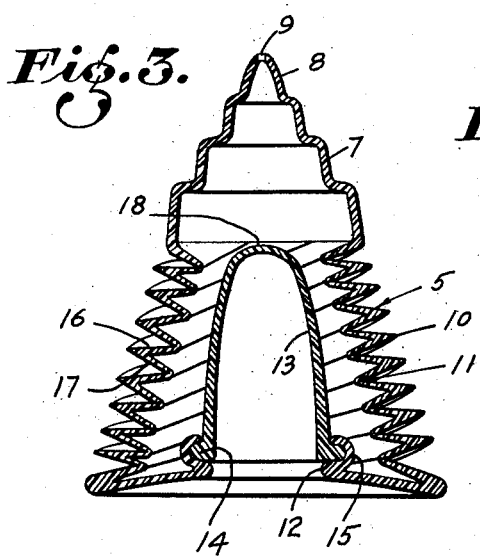
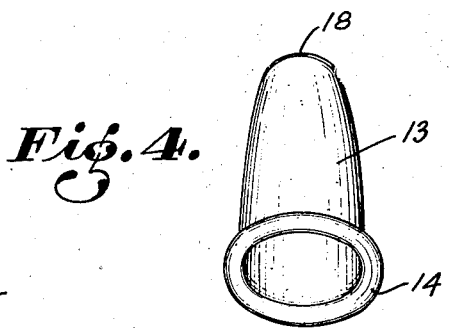
INVENTOR.
CAROL PARKER
BY
*Jesse P. Mann*
ATTORNEY Aug. 11, 1959     C. PARKER     2,899,110
COLLAPSIBLE CONTAINER
Filed March 12, 1957     2 Sheets-Sheet 2
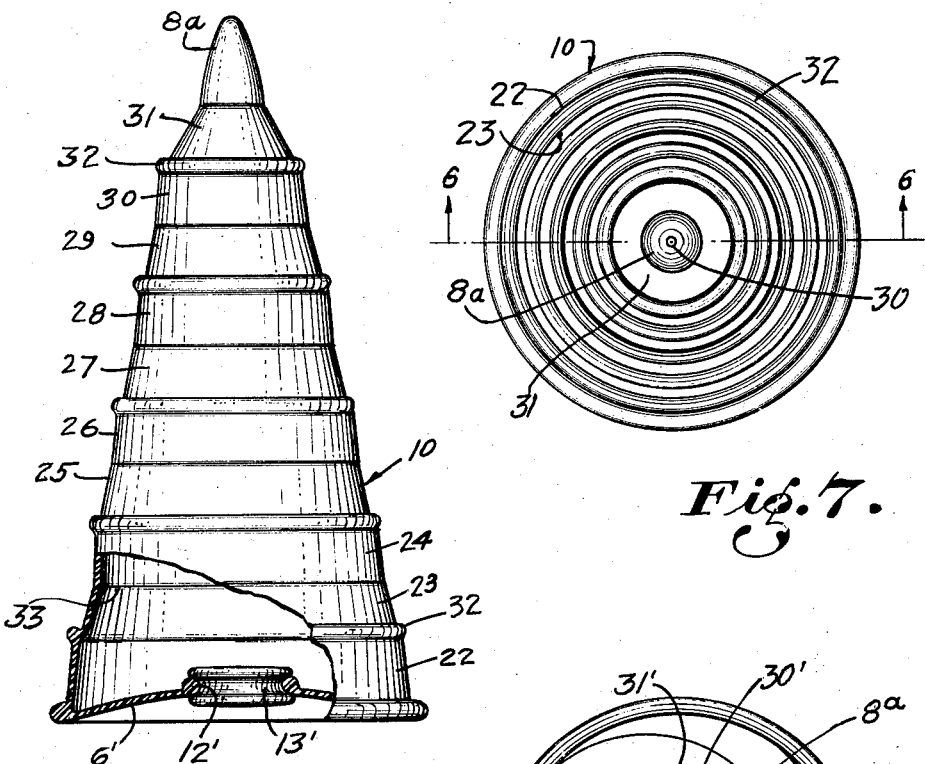
Fig.5.
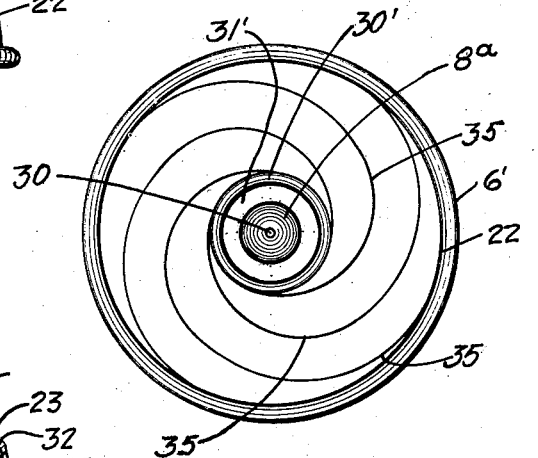
Fig.7.
Fig.8.
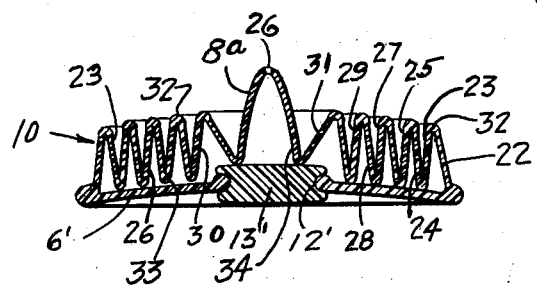
Fig.6.
INVENTOR.
CAROL PARKER
BY
ATTORNEY.

United States Patent Office 2,899,110
Patented Aug. 11, 1959

2,899,110

COLLAPSIBLE CONTAINER

Carol Parker, Glendale, Calif.

Application March 12, 1957, Serial No. 645,525

1 Claim. (Cl. 222—215)

This invention embraces improvements over the container and dispenser disclosed in United States Letters Patent No. 2,723,779, granted November 15, 1955, and relates to containers for products of fluid and viscous character, and in particular to dispensing containers which may be made from thin flexible materials, such as those known as plastics, for example, which may be readily molded.

It is an object of the invention to provide a container which is especially adapted for holding and dispensing aqueous and oleaginous liquids or mixtures. The invention is especially useful in connection with food products, such as condiments, creams, pastes, whipped cream, cake topping, peanut butter, hors d'oeuvres, catsup, and the like. The invention may be also used for the dispensing of liquid viscous and plastic materials other than foods, for example, detergents, creams, shampoos, toothpastes and adhesives, such as pastes or glue.

It is an object of the invention to provide a dispensing container having a base on which it stands upright and having spirally or helically pleated side walls enabling the container to be collapsed by applying pressure and a twisting motion thereto so that a desired quantity of the contents may be ejected from the outlet opening of the container.

It is a further object of the invention to provide a dispensing container wherein the pleats are circular so that as the container is collapsed one portion thereof will fold down within another.

Further objects and advantages of the invention may be brought out in the following part of the specification wherein some minor details have been explained for the purpose of making a complete disclosure, without intending, however, to limit the scope of the invention which is set forth in the appended claim.

Referring to the acocmpanying drawings which are for illustrative purposes only:

Fig. 1 is an elevational view of a preferred embodiment of my invention as it appears when filled;

Fig. 2 is a cross-sectional view corresponding to Fig. 1;

Fig. 3 is a sectional view showing the container nearly collapsed;

Fig. 4 is a perspective view of the plug which closes the opening in the bottom wall of the container;

Fig. 5 is a partly sectioned view of an alternative form of the invention;

Fig. 6 is a cross-sectional view of the container of Fig. 5 in fully collapsed condition;

Fig. 7 is a plan view corresponding to Fig. 6; and

Fig. 8 is a plan view similar to Fig. 7 but showing how the pleats may be arranged spirally around the outlet nozzle.

The container shown in Figs. 1 to 3 comprises a side wall 5, a bottom wall 6 and a top wall 7 which is of stepped form, as shown, and has a tip or nozzle 8 in which an opening 9 may be formed through which portions of the content of the container may be delivered. The bottom wall has an opening 12 adapted to be closed by a hollow molded plug 13 which has an external bead or lip 14 adapted to enter a channel 15 formed around the opening 12 of the bottom wall.

For the purpose of establishing a descriptive terminology, the side wall 5 of the container is referred to as being spirally pleated. The pleates P would be helical if the side wall 5 of the container were cylindrical, but the side wall 5 tapers upwardly, and therefore, the pleats P, which would otherwise be helical, form spirals extending along but converging toward the vertical central axis of the container. As best shown in Fig. 2 each pleat P consists of an inwardly and upwardly sloping striplike wall portion 16 and a downwardly and inwardly striplike wall portion 17, the wall portions 16 and 17 respectively having their lower and upper edges joined at a sharp ridge 10 and these wall portions 16 and 17 being arranged to follow the spiral path of the ridge 10 from the bottom to the top of the wall 5. The lower edge of each lower wall 17 is joined to the upper edge of each upper strip wall 16 so as to form an inner ridge 11. The inner ridges 11 extend spirally from the periphery of the bottom wall 6 to the lower edge of the top wall 7.

If the top wall 7 of the container is grasped by one hand, for example, the left hand, and the bottom wall of the container is engaged by the opposite hand, and upward movement of the bottom wall 6, with a slight clockwise rotation, is effected, the vertical extension of the pleats P will be reduced. That is to say, the ridges 10 will be moved toward each other so as to lie closer together and the angular relation of the strip walls 16 and 17 will be reduced so that the angles formed by them will become more acute, as shown in Fig. 3 wherein the container is in nearly collapsed condition. By further movement of the bottom wall 6 toward the top wall 7, the rounded upper end 18 of the filler or plug member 13 may be caused to move up into the interior of the top 7, at which time the consecutive strip walls 16 and 17 of the side wall 5 will lie substantially in face to face engagement. The container is molded from a flexible plastic material, such as polyethylene, for example, and the tip 8 will be closed. The container is filled through the opening 12 and the plug 13 is applied. When use of the contents of the container is desired an opening 9 may be formed in the end of the tip 8 by cutting or punching; whereupon, desired quantities of the contents may be ejected through the opening 9 by manipulation of the container in the manner described in the foregoing.

In the form of the invention shown in Figs. 5–7, the side wall pleats are formed concentrically. This container has a side wall 10' which consists of consecutive annular walls 22 to 31 inclusive. When the container is collapsed, as shown in Fig. 6, these walls 22–31 lie one within the other and are progressively smaller in diameter. The outer annular wall 22 converges upwardly and its upper edge is joined by a rib 32 with the upper edge of the adjacent annular wall 23. Similarly the walls 24—25, 26—27, 28—29 and 30—31 are connected by circular ribs 32. The lower edges of the walls 23—24, 25—26, 27—28 and 29—30 are connected by annular ridges 33. The lower edge of the wall 31 is connected by an annular ridge with the lower end of the nozzle 8a which has therein an opening preferably made at the time use of the contents of the container is desired. The bottom wall 6' of the container has an opening 12' which is closed by a plug 13' after the container is filled.

The container may be molded with its walls positioned as shown in Fig. 6 or in positions intermediate those in which the walls 22–31 are shown in Figs. 5 and 6. The walls 22–31 are shown in Fig. 5 in the positions which they assume when the container is filled. As the contents are ejected through the nozzle opening 26 of the annular walls 23–31 gradually fold one within the other and into a position within the outer annular wall 22, as shown in Fig. 6.

In Fig. 8, which is a plan view similar to Fig. 6, I show the manner in which the pleats which are arranged concentrically within the outer wall 22 when the container is in collapsed condition are instead extended spirally. For example, referring to Fig. 8, I have schematically shown the outer annular wall 22 which projects upwardly from the peripheral portion of the bottom 6'. From the outer annular wall pleats 35 are extended spirally inwardly to an annular wall 30' which is similar to the annular wall 30 of Fig. 6. The annular wall 30' is connected by an annular conical wall 31' to the lower end of a tip or nozzle member 8a having a point or extremity 36 in which an opening may be formed when it is desired to use the contained product. When the container shown in Fig. 8 is filled the pleats are extended somewhat in the manner shown in Fig. 5 except that they will extend spirally instead of circularly as shown in Fig. 5.

I claim:

A dispensing container comprising a generally circular top, a generally circular bottom, and a generally conical side wall of flexible resilient material connecting the peripheral portions of said top and bottom, said side wall comprising a plurality of side by side integrally formed pleats, each of said pleats consisting of an inwardly and upwardly sloping upper strip wall and an inwardly and downwardly sloping lower strip wall, the outer edges of said strip walls of each pleat intersecting to define an outwardly projecting hinged connection, and the inner edges of the strip walls of said pleats intersecting to define an inwardly projecting hinged connection, said strip walls being approximately flat in transverse direction and being adapted to be brought into close face to face relation by the action of said hinged connections without exceeding the elastic limit thereof in response to collapsing movement applied to said top and bottom the degree of conicity of said walls being sufficient to permit said inwardly projecting hinged connections to substantially contact said bottom when said container is collapsed.

References Cited in the file of this patent

UNITED STATES PATENTS

| | | |
|---|---|---|
| 687,790 | Scales | Dec. 3, 1901 |
| 2,139,143 | Wiswell | Dec. 6, 1938 |
| 2,268,993 | Sanders | Jan. 6, 1942 |
| 2,723,779 | Parker et al. | Nov. 15, 1955 |
| 2,833,448 | Lerner | May 6, 1958 |

FOREIGN PATENTS

| | | |
|---|---|---|
| 725,864 | France | Feb. 16, 1932 |